United States Patent [19]

Wallace et al.

[11] Patent Number: 4,655,425
[45] Date of Patent: Apr. 7, 1987

[54] UNIVERSAL CUP HOLDER

[75] Inventors: Robert S. Wallace, Los Angeles, Calif.; Ian C. Goldey; Terry L. Nelson, both of 6550 #1, Van Alden St., Reseda, Calif. 91335

[73] Assignees: Ian C. Goldey; Terry L. Nelson, both of Reseda, Calif.; part interest to each

[21] Appl. No.: 800,712

[22] Filed: Nov. 22, 1985

[51] Int. Cl.⁴ .................................................. A47K 1/05
[52] U.S. Cl. .................................. 248/311.2; 248/499; 248/308
[58] Field of Search ...................... 248/311.2, 310, 312, 248/312.1, 213.2, 318, 459, 311.3, 309.1, 499, 500, 308

[56] References Cited

U.S. PATENT DOCUMENTS

| D. 162,959 | 4/1951 | Janes | 248/311.2 |
|---|---|---|---|
| 1,619,099 | 3/1927 | Beck | 248/310 |
| 1,644,665 | 10/1927 | Beck | 248/310 |
| 1,847,471 | 3/1932 | Chaffe | 248/499 |
| 2,277,738 | 3/1942 | Wilkinson | 248/311.2 |
| 2,302,170 | 11/1942 | Basler | 248/311.2 |
| 2,532,244 | 11/1950 | Pasmore | 248/311.2 |
| 2,788,189 | 4/1957 | Groya | 248/310 |
| 3,013,359 | 12/1961 | Cross | 248/459 |
| 3,036,717 | 5/1962 | Johnson | 248/311.2 |
| 3,317,171 | 5/1967 | Kramer | 248/311.2 |
| 3,319,913 | 5/1967 | Schoepe | 248/311.2 |

Primary Examiner—Reinaldo P. Machado
Assistant Examiner—Alvin Chin-Shue
Attorney, Agent, or Firm—William W. Haefliger

[57] ABSTRACT

A universal cup holder, comprising
 (a) a generally horizontal base to support a cup,
 (b) an upright frame attached to the base,
 (c) a retainer attached to the frame and extending generally horizontally above the base to retain the cup wall,
 (d) a resilient pusher element supported by the frame to engage the cup wall and urge the cup toward the retainer,
 (e) there being structure attached to the frame to attach the holder to a vehicle door.

6 Claims, 8 Drawing Figures

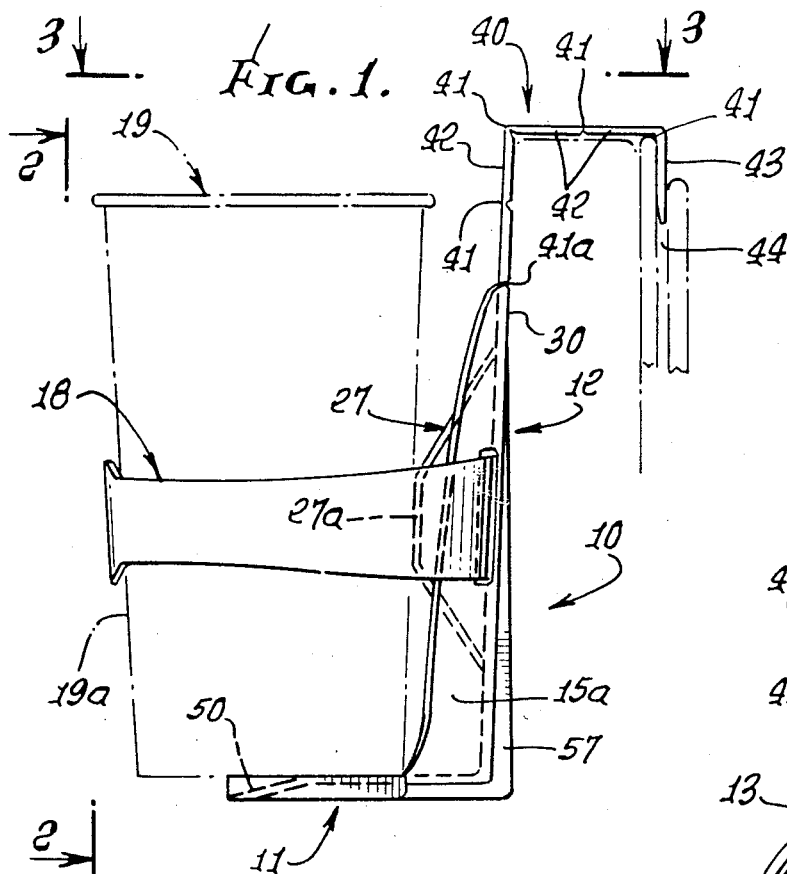
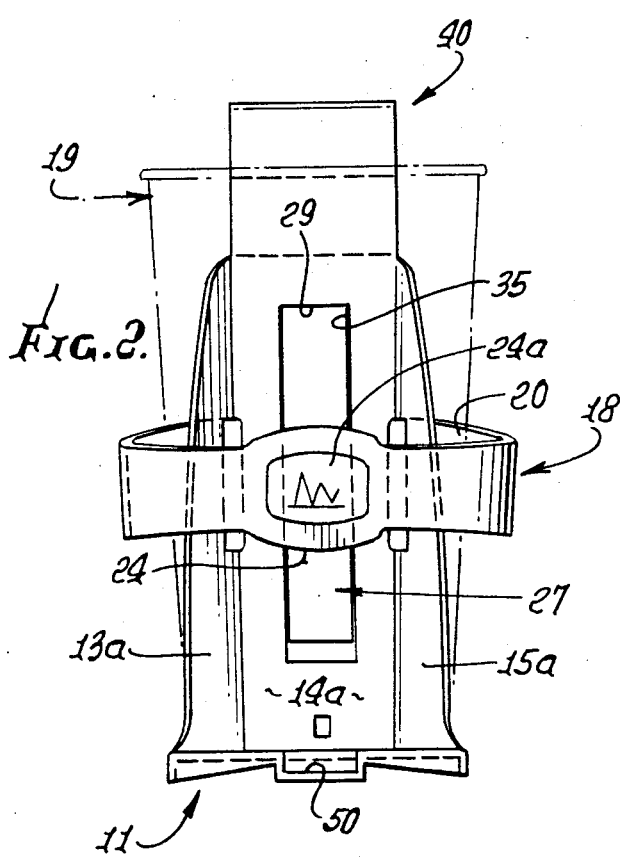
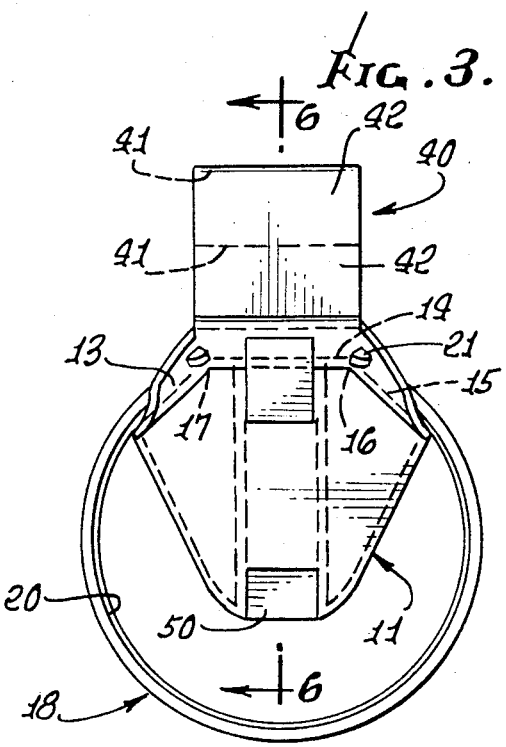
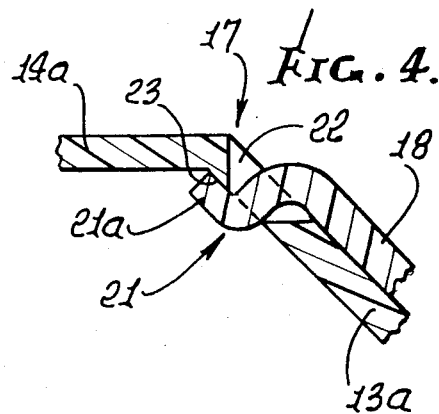

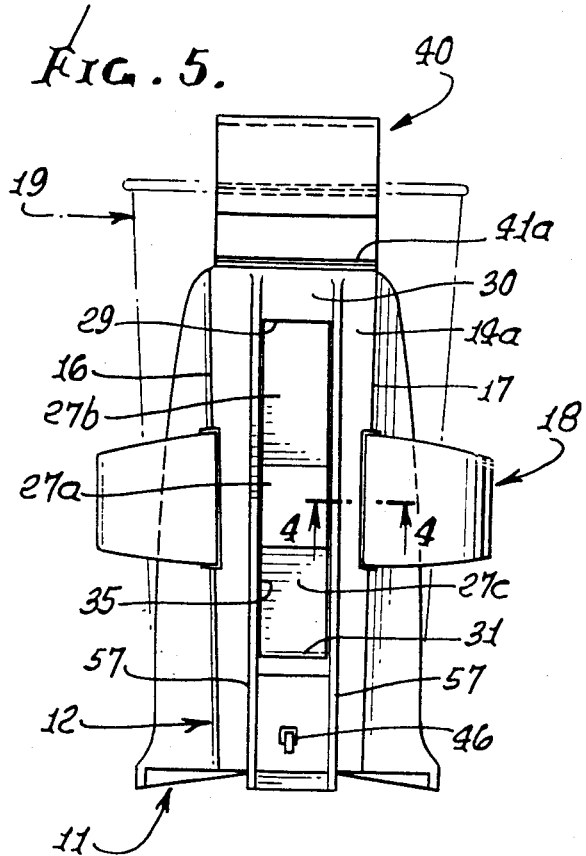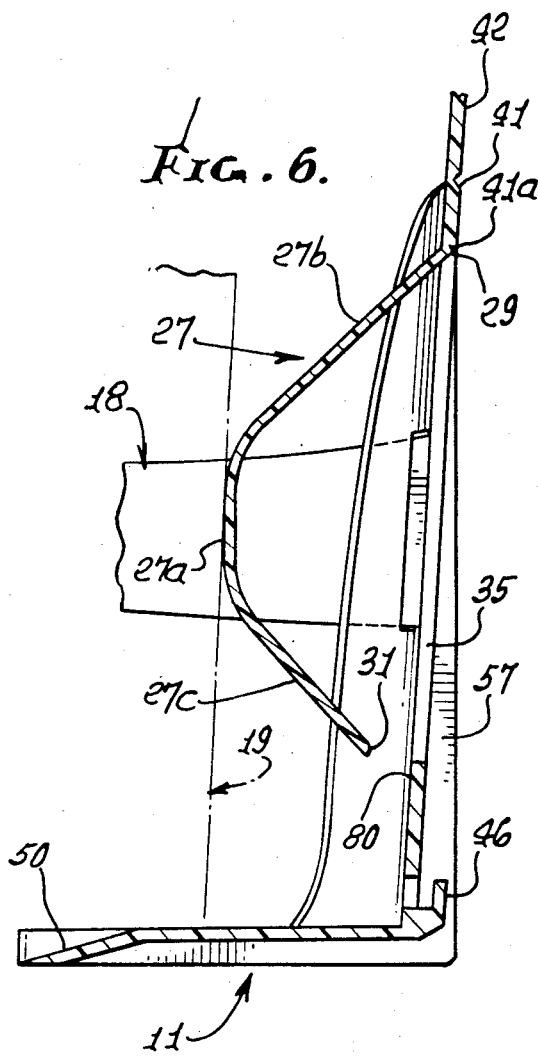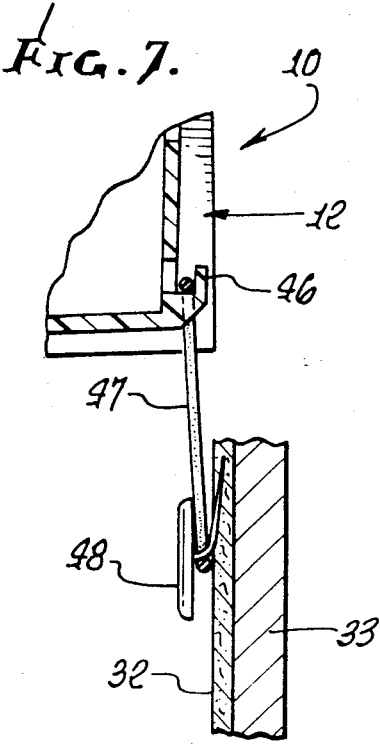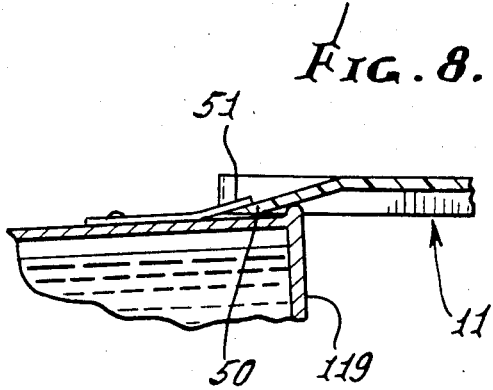

UNIVERSAL CUP HOLDER

BACKGROUND OF THE INVENTION

This invention relates generally to cup or can supports, and more particularly to a support which is suspended by a vehicle door, and adjustably and firmly retains or holds cans or cups of different sizes in secure, upright position, adjacent the vehicle door.

There is need for devices of the above type, in order to prevent inadvertent overturning and spilling of liquid filled drinking cups or cans, in vehicles. Such accidents can easily occur when the can or cup is bottom supported on the vehicle seat or floor, vehicle motion inducing overturning of the can or cup.

There is also need for such a device which is exceedingly simple in construction, easy to produce, and easy to use and store in vehicles.

SUMMARY OF THE INVENTION

It is a major object of the invention to provide apparatus meeting or satisfying the above needs. Basically, it comprises (a) a generally horizontal base to support a cup,
  (b) an upright frame attached to the base,
  (c) a retainer attached to the frame and extending generally horizontally above the base to retain the cup wall,
  (d) a resilient pusher element supported by the frame to engage the cup wall and urge the cup toward the retainer,
  (e) and means attached to the frame to attach the holder to a vehicle door.

As will be seen the attachment means may with unusual advantage comprise a flap integral with the frame, the flap consisting of molded plastic and defining a plurality of thin plastic hinges which extend in generally parallel relation and the spaced apart along the flap length.

It is another object to provide a pusher element to have hinged attachment to the frame, and with a portion projecting away from the cup to engage the side of the frame; the pusher is typically bowed toward the cup, and the frame has a rear panel defining a slot to allow adjustment swinging of the pusher. In this regard, the frame may typically extend upwardly in the form of multiple thin panels to stiffen the frame and the cantilevered base against downward flexing under loading imposed by a liquid filled cup; and one panel may also support the pusher to swing and the retainer to have releasable attachment to the frame, whereby detachment of the retainer strap facilitates ease of storage of the device.

These and other objects and advantages of the invention, as well as the details of an illustrative embodiment, will be more fully understood from the following specification and drawings, in which:

DRAWING DESCRIPTION

FIG. 1 is a side elevation;
FIG. 2 is an end elevation on lines 2—2 of FIG. 1;
FIG. 3 is a top plan view on FIGS. 3—3 of FIG. 1;
FIG. 4 is a fragmentary section on lines 4—4 of FIG. 5, flap connection to the frame;
FIG. 5 is a rear elevation;
FIG. 6 is a vertical section on lines 6—6 of FIG. 3;
FIG. 7 is a view showing auxiliary resilient retention of the cup holder to a door; and
FIG. 8 is a fragmentary section showing use of the holder to open a cold drank can top.

DETAILED DESCRIPTION

The unusual cup holder example as shown in the drawings at 10 includes a generally elongated base 11 to support a cup; and an upright frame 12 integrally molded to the rear of the base, as at 13, 14 and 15. The frame extends upwardly in three panels 13a, 14a and 15a, all integrally molded as a unit, and connected at upright corners 16 and 17. This construction prevents flexing of the frame, and downward flexing of the base relative to the frame, under loading exerted by a liquid filled cup 19.

A retainer 18 is attached to the frame and extends generally horizontally above the base to retain the wall 19a of cup 19. The retainer may advantageously comprise a thin flexible plastic strap extending in a loop as shown, so as to have a loop shaped, upright, flat inner wall 20 to firmly contact and orient the wall of the cup. The ends 21 of the retainer may advantageously interfit vertical slots in the frame, proximate the corners 16 and 17. See FIG. 4 showing retainer strap L-shaped end 21 projecting through slot 22 in panel 13a adjacent corner 17. Tang 21a on end 21 flatly engages the inner side of panel 13a, at 23, as shown. Enlargement 24 on the strap may receive in advertising decal 24a.

A resilient pusher element 27 is supported by the frame 12 to engage the cup rear wall and urge the cup forwardly (leftwardly in FIG. 1) toward the retainer strap. As shown, the pusher element 27 may consist of thin plastic material which has a mid-portion 27a bowed toward the cup rear wall to resiliently engage the latter. Pusher element 27 has a top portion 27b with plastic hinged attachment at 29 to the lower edge of a crosspiece 30 formed by panel 14a (see FIGS. 5 and 6). The lower portion 27c of the pusher element projects away from the cup to have terminal 31 slidably engagable with the frame surface 80 to slide downwardly as the pusher is resiliently compressed by a cup. The pusher swings in a vertical, front to rear direction or plane to adjust to the door side and the cup, being resiliently flexed or bowed therewbetween. A slot 35 in panel 14a allows such adjustment swinging.

Means is also provided to attach the frame to the car or vehicle door. Such means may advantageously take the form of a flap 40 integral with the frame. As shown, the flap consists of molded plastic and defines a plurality, of thin, parallel plastic hinges 41 integral with and interconnecting flap segments 42, allowing ease folding of the flap to the door contour. See FIG. 1. The hinges are spaced apart along the flap length, and the end portion 43 of the flap may fit downwardly into a window frame slot 44. A hinge 41a attaches the flap to the upper extent 30 of the panel 14a.

A tang 46 on the frame panel 14a, near its lower most extent may receive a loop, such as rubber band 47, to resiliently or otherwise urge or hold the frame in a downward position adjacent the vehicle door 33. A tack 48 pushed into the door upholstery 32, holds the lowermost end of the band 47 downwardly. See FIG. 7.

The base 11 may have a locally forwardly tapered edge portion 50 adapted to be inserted under a pop top closure on a cold drink can 119, to lift that closure 51, by leverage exertion as between the can and base 11. See FIG. 8.

Finally note the two upright stiffening ribs 57 integral with rear panel 14a and which are configured to engage the side of the vehicle door to support the apparatus, sidewardly.

I claim:

1. In a universal cup holder, the combination comprising (a) a generally horizontal base to support a cup,
    (b) an upright frame attached to the base, whereby the base is part of the frame,
    (c) a retainer attached to the frame and extending generally horizontally above the base to retain the cup wall,
    (d) a resilient pusher element supported by the frame to engage the cup wall and urge the cup toward the retainer,
    (e) and means attached to the frame to attach the holder to a vehicle door,
    (f) the retainer being a strap forming a loop,
    (g) said pusher extending above and below the level of the strap loop and having hinged attachment to the frame substantially above the level of the loop, whereby the pusher may swing toward and away from the strap loop extent furthest from the frame,
    (h) the pusher being vertically bowed toward the strap loop extent furthest from the frame, the lower portion of the pushed extending downwardly below the level of the strap loop, to engage the frame,
    (i) the frame having a rear central panel defining a slot toward and away from which the pusher is swingable as accommodated by said hinged attachment,
    (j) the frame extending upwardly and having side panels connected to the base, the central panel swingably supporting the pusher,
    (k) the retainer being a molded plastic strap having opposite ends engaging and biased by said two side panels which are angled relative to the central panel to direct the strap in loop configuration.

2. The combination of claim 1 wherein the base has a tapered edge portion adapted to lift a beverage can top closure.

3. The combination of claim 1 including a resilient member attached to the frame and also attached to element on a vehicle door side to resiliently urge the frame toward the door side.

4. The combination of claim 1 wherein said last named means comprises a flap integral with the frame.

5. The combination of claim 4 wherein the flap consists of molded plastic and defines a plurality of thin plastic hinges which extend in generally parallel relation and the spaced apart along the flap length.

6. The combination of claim 4 wherein said flap and said frame are a one-piece integrally molded unit.

* * * * *